US012738429B2

(12) United States Patent
Tien

(10) Patent No.: US 12,738,429 B2
(45) Date of Patent: Sep. 15, 2026

(54) CURVED-SURFACE BUTTON STRUCTURE

(71) Applicant: KINPO ELECTRONICS, INC., New Taipei City (TW)

(72) Inventor: Tsung-Ping Tien, New Taipei City (TW)

(73) Assignee: KINPO ELECTRONICS, INC., New Taipei City (TW)

( * ) Notice: Subject to any disclaimer, the term of this patent is extended or adjusted under 35 U.S.C. 154(b) by 327 days.

(21) Appl. No.: 18/667,325

(22) Filed: May 17, 2024

(65) Prior Publication Data

US 2025/0279251 A1 Sep. 4, 2025

(30) Foreign Application Priority Data

Mar. 1, 2024 (TW) ................................ 113202108

(51) Int. Cl.
*H01H 13/14* (2006.01)
*H01H 13/04* (2006.01)
*H01H 13/20* (2006.01)

(52) U.S. Cl.
CPC ............ *H01H 13/14* (2013.01); *H01H 13/04* (2013.01); *H01H 13/20* (2013.01)

(58) Field of Classification Search
CPC ...... H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20
See application file for complete search history.

(56) References Cited

U.S. PATENT DOCUMENTS 6,933,454 B2 * 8/2005 Ishibashi ................ H01H 21/24 200/341
7,247,807 B2 * 7/2007 Gutierrez ............ H01H 13/705 200/344
7,256,363 B1 * 8/2007 McConnell ............ H01H 13/20 200/296

* cited by examiner

*Primary Examiner* — Ahmed M Saeed
(74) *Attorney, Agent, or Firm* — HDLS IPR SERVICES; Chun-Ming Shih

(57) ABSTRACT

A curved-surface button structure having a housing, a button arranged in the housing, a button assembly and a positioning sleeve. The housing has a through hole, a curved surface and an internal surface. The button has a driven part. The button assembly has a pressing plate, an installation seat and an extending column. The installation seat is arranged on the internal surface. The pressing plate is connected to the installation seat. The extending column is extended from the pressing plate toward the button. The positioning sleeve is adapted to sheathe the extending column. The positioning sleeve is larger than the driven part. When the button assembly is pressed, the extending column abuts against the driven part, and the positioning sleeve surrounds the driven part to effectively position a movement range of the button assembly to prevent from getting stuck or slipping off.

12 Claims, 8 Drawing Sheets

CURVED-SURFACE BUTTON STRUCTURE

BACKGROUND OF THE INVENTION

Technical Field

The technical field relates to a button structure, in particular to a curved-surface button structure applied on a curved surface.

Description of Related Art

With a vigorous development of electronic technology, various electronic devices have been provided in the market for various requirements of consumers. The electronic device generally has a housing for protecting electronic components therein so as to prevent the electronic components from damage caused by collisions with foreign objects, dust adhesion, or water vapor. In addition, many electronic devices are provided with buttons allowing users quickly and intuitively operate specific functions.

A button has a keycap and a pressing piece. The keycap is accommodated in a hole of the housing and can be pressed by the user. The pressing piece is disposed at a bottom of the keycap corresponds to a button in the electronic device, so that when the user presses the keycap, the pressing piece is driven to trigger the button at the same time to transmit a signal. In general, the button also has a fixed seat disposed on an internal surface of the housing and multiple elastic structures connected between the fixed seat and the keycap, so that the pressed keycap can be reset by elastic forces of the elastic structures. Alternatively, multiple limiting structures may be disposed on the internal surface of the housing to limit a pressed range of the keycap, thereby preventing the keycap from getting stuck caused by skew during a pressed process which may let the button unable to be reset.

However, when the housing of the electronic device has a curvature, the user may press the keycap in an angle, in an area or at a position which leads to a shift of stress between the button and the button, and the button may be skewed therefore. Furthermore, a larger pressing force may make the pressing piece to slip off over the button, and the pressed button may get stuck or unable to be reset by the elastic forces of the elastic structures. Also, the curvature of the housing may make a side of the button to slip off over strokes of the limiting structures when pressed, and the pressing piece may shift from the button and therefore fail to trigger the button because of skew of the button. Therefore, when the pressing piece is shifted, the elastic structures may be broken because of over pressing by the user.

In views of this, in order to solve the above disadvantage, the inventor studied related technology and provided a reasonable and effective solution in this disclosure.

SUMMARY OF THE INVENTION

A purpose of this disclosure is effectively positioning a movement range of an assembly to avoid skew, and preventing the button assembly from getting stuck or trigger failure cause by skew or slipping off.

The disclosure is directed to a curved-surface button structure having a housing, a button, a button assembly and a positioning sleeve. The housing has a first case and a second case assembled with each other. The first case has a through hole, a curved surface and an internal surface. The curved surface and the internal surface are disposed at two sides of the first case opposite to each other. The through hole is communicated between the curved surface and the internal surface. The button is arranged in the housing, the button has a base and a driven part. The driven part is pressably connected with the base to face the internal surface. The button assembly has a pressing plate, an installation seat and an extending column. The installation seat is arranged on the internal surface. The pressing plate is connected to the installation seat and disposed corresponding to the through hole. The extending column is extended from the pressing plate toward the button. The positioning sleeve is adapted to sheathe an end of the extending column. An inner diameter of the positioning sleeve is larger than an outer diameter of the driven part. When the button assembly is free from forcing, the pressing plate is accommodated in the through hole, and a gap is defined between the extending column and the driven part. When the button assembly is pressed by an external force, the pressing plate is retracted into the through hole, the extending column abuts against the driven part, and the positioning sleeve surrounds the driven part.

One of the exemplary embodiments, an installation distance is defined between an end surface of the positioning sleeve away from the first case and an end surface of the extending column away from the first case, and the installation distance is greater than or equal to 0.5 mm and less than or equal to 3 mm.

One of the exemplary embodiments, the installation distance is greater than or equal to 1.62 mm and less than or equal to 1.7 mm.

One of the exemplary embodiments, a distance between the positioning sleeve and the base is larger than the gap when the button assembly is free from forcing.

One of the exemplary embodiments, the positioning sleeve is free from contacting the base when the extending column abuts against the driven part.

One of the exemplary embodiments, the first case has a plurality of limiting pieces, each limiting piece is extended from the internal surface toward the second case, the limiting pieces surrounds the pressing plate to limit a movement range of the pressing plate.

One of the exemplary embodiments, the extending column is a column with a cross-shaped cross section, the extending column is tapered from the pressing plate toward the button, and the positioning sleeve is in a hollow cylinder shape.

One of the exemplary embodiments, the installation seat has a frame and a pair of elastic arms, the frame surrounds the pressing plate, each elastic arm has two ends respectively connected with the pressing plate and the frame.

One of the exemplary embodiments, each of the elastic arm is in an S shape, a wavy shape, a zigzag shape or a lightning shape.

One of the exemplary embodiments, the first case has a plurality of hooks, each hook is extended from the internal surface to the second case to snap the frame.

One of the exemplary embodiments, an inner diameter of the positioning sleeve is less than an inner diameter of the base.

One of the exemplary embodiments, the extending column and the positioning sleeve are formed as one piece.

One of the exemplary embodiments, when the button assembly is free from forcing, a spaced distance is defined between the positioning sleeve and the base, and the spaced distance is larger than the gap.

The curved-surface button structure of this disclosure is provided with a positioning sleeve at the end of the extending column, and the inner diameter of the positioning sleeve is larger than the outer diameter of the driven part. Moreover, the inner diameter of the positioning sleeve is smaller than the inner diameter of the base, so that the button assembly disposed on the curved surface is positioned by the positioning sleeve surrounding the driven part when pressed by an external force, thereby effectively positioning a movement range of the button assembly to avoid shifting from the button which is caused by skew. Furthermore, the button assembly is prevented from getting stuck of trigger failure caused by shifting or slipping off.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

Figure 1:
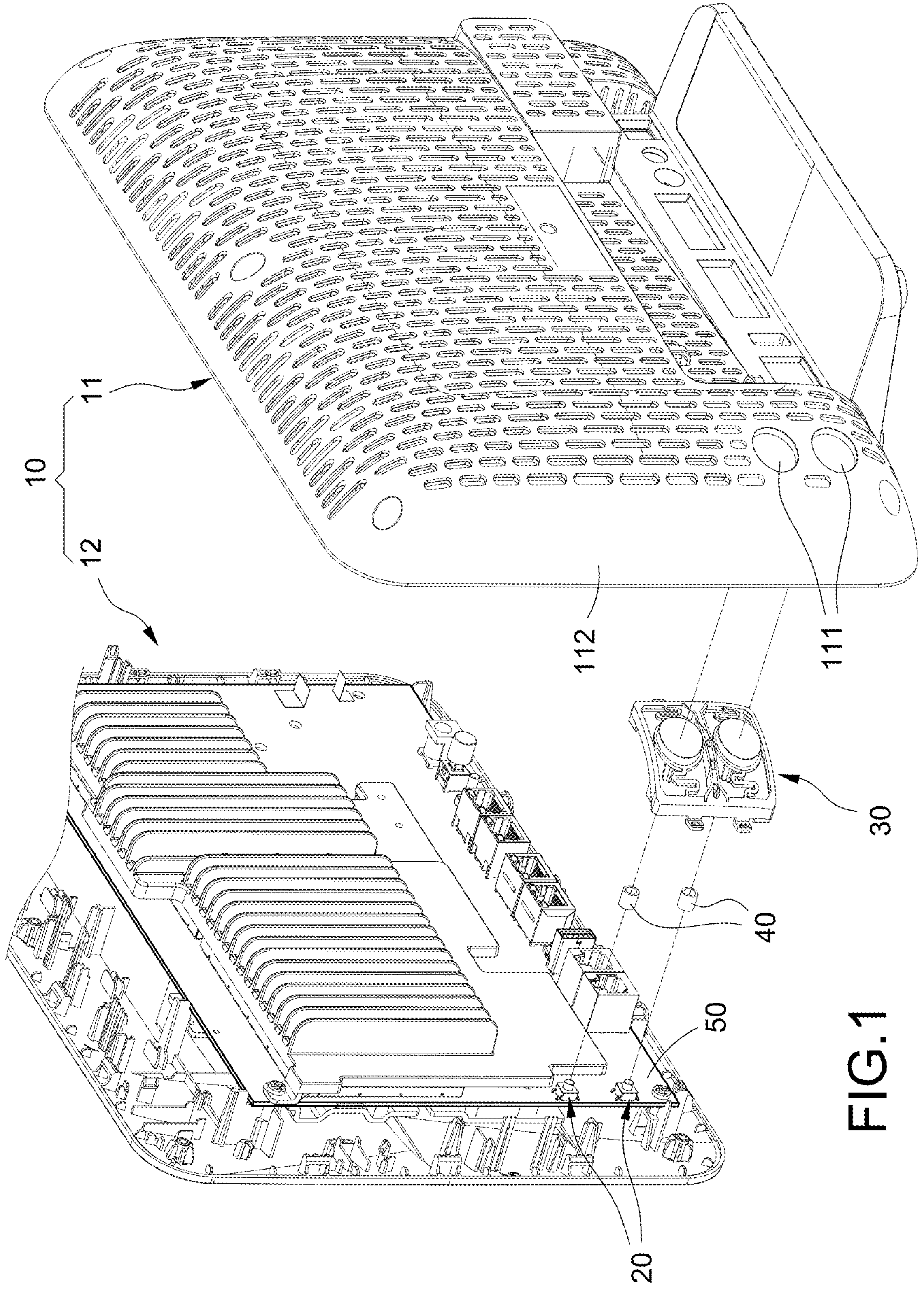
FIG. 1 is an exploded view according to this disclosure.

The technical contents of this disclosure will become apparent with the detailed description of embodiments accompanied with the illustration of related drawings as follows. It is intended that the embodiments and drawings disclosed herein are to be considered illustrative rather than restrictive.

It should be understood that the orientations or positional relationships in this disclosure which are indicated by the terms such as "front side", "rear side", "left side", "right side", "front end", "rear end", "end", "vertical", "horizontal", "vertical", "top" and "bottom" are based on the orientations or positional relationships as shown in the drawings. These are only used for describing this disclosure and simplifying the description rather than indicating or implying that the device or element have a specific orientation or be constructed and operated in a specific orientation, and it should not be considered as limitations of the scopes of this disclosure.

The terms used herein such as "first," "second," "third," "fourth," and "fifth" for describing various elements, components, regions, levels or portions, these elements, components, regions, levels or portions should not be limited by these terms. These terms are only used for distinguishing one element, component, area, levels or section from another. Unless a sequence or order is clearly indicated in the context, terms such as "first," "second," "third," "fourth" and "fifth" used herein do not imply the sequence or order.

The terms used herein without additional definition such as "substantially" and "approximately" are used to describe and illustrate small changes. When used in an event or situation, the term may include the precise moment at which the event or situation occurs, and a close approximation to moment the event or situation occurs. For example, when combined with a numerical value, the term may include a range of variation less than or equal to ±10% of the numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Detailed descriptions and technical contents of this disclosure is described in the flowing paragraph with reference to the drawings. However, the drawings are attached only for illustration and are not intended to limit this disclosure.

This disclosure is directed to a curved-surface button structure as shown in FIGS. 1 to 6 which has a housing 10, at least a button 20, at least a button assembly 30 and at least a positioning sleeve 40.

The housing 10 has a first case 11 and a second case 12 assembled with each other. According to this embodiment, the first case 11 is assembled on a side of the second case 12, but scopes of this disclosure should not be limited to the embodiment. For example, the first case 11 may be assembled on a top or a bottom of the second case 12. first case 11 has through hole 111, a curved surface 112 and an internal surface 113. Specifically, the curved surface 112 and the internal surface 113 are disposed at two sides of the first case 11 opposite to each other, namely that the curved surface 112 is disposed on an external surface of the first case 11. The internal surface 113 may be a flat plane, an inclined surface, an arc surface or a curved surface, but scopes of this disclosure should not be limited to the embodiment. The through hole 111 is communicated between the curved surface 112 and internal surface 113 to penetrate the first case 11. A number of the through holes 111 is arranged corresponding to a required number of the button assembly 30. According to this embodiment, two through holes 111 are provided, but scopes of this disclosure should not be limited to the embodiment. Additional button assemblies 30 and additional through holes 111 may be arranged according to various requirements. For example, one of the through holes 111 is described following for illustration.

According to this embodiment, two buttons 20 is arranged corresponding to two button assemblies 30, but scopes of this disclosure should not be limited to the embodiment. For example, one of the buttons 20 is described following for illustration. The button 20 is disposed in the housing 10. Specifically, the curved-surface button structure according to this disclosure further has a circuit board 50 the circuit board 50 is arranged in the housing 10 and fixed with at least one of the first case 11 and the second case 12, and the button 20 is fixed on the circuit board 50 to be electrically connected with the circuit board 50. The button 20 has a base 21 and a driven part 22. The base 21 is fixed on the circuit board 50. The driven part 22 is pressably connected to the base 21 to face the internal surface 113 of the first case 11. Accordingly, the driven part 22 is retracted into the base 21 when pressed so as to act a signal transmission to perform an operation of specific functions.

According to this embodiment, two button assemblies 30 are provided, but scopes of this disclosure should not be limited to the embodiment. For example, one of the button assemblies 30 is described following for illustration. The button assembly 30 has a pressing plate 31, an installation seat 32 and an extending column 33. The installation seat 32 is arranged on the internal surface 113 of the first case 11, An arrangement of the installation seat 32 is illustrated in later paragraph and not detailly described here. The pressing plate 31 is connected to the installation seat 32 and disposed corresponding to the through hole 111. The extending column 33 is extended from the pressing plate 31 toward the button 20. According to this embodiment, the extending column 33 is a column with a with a cross-shaped cross section, and the extending column 33 is an inverted cone which is tapered from the pressing plate 31 toward the button 20, but the scoped of this disclosure should not be limited to the embodiment.

Figure 5:
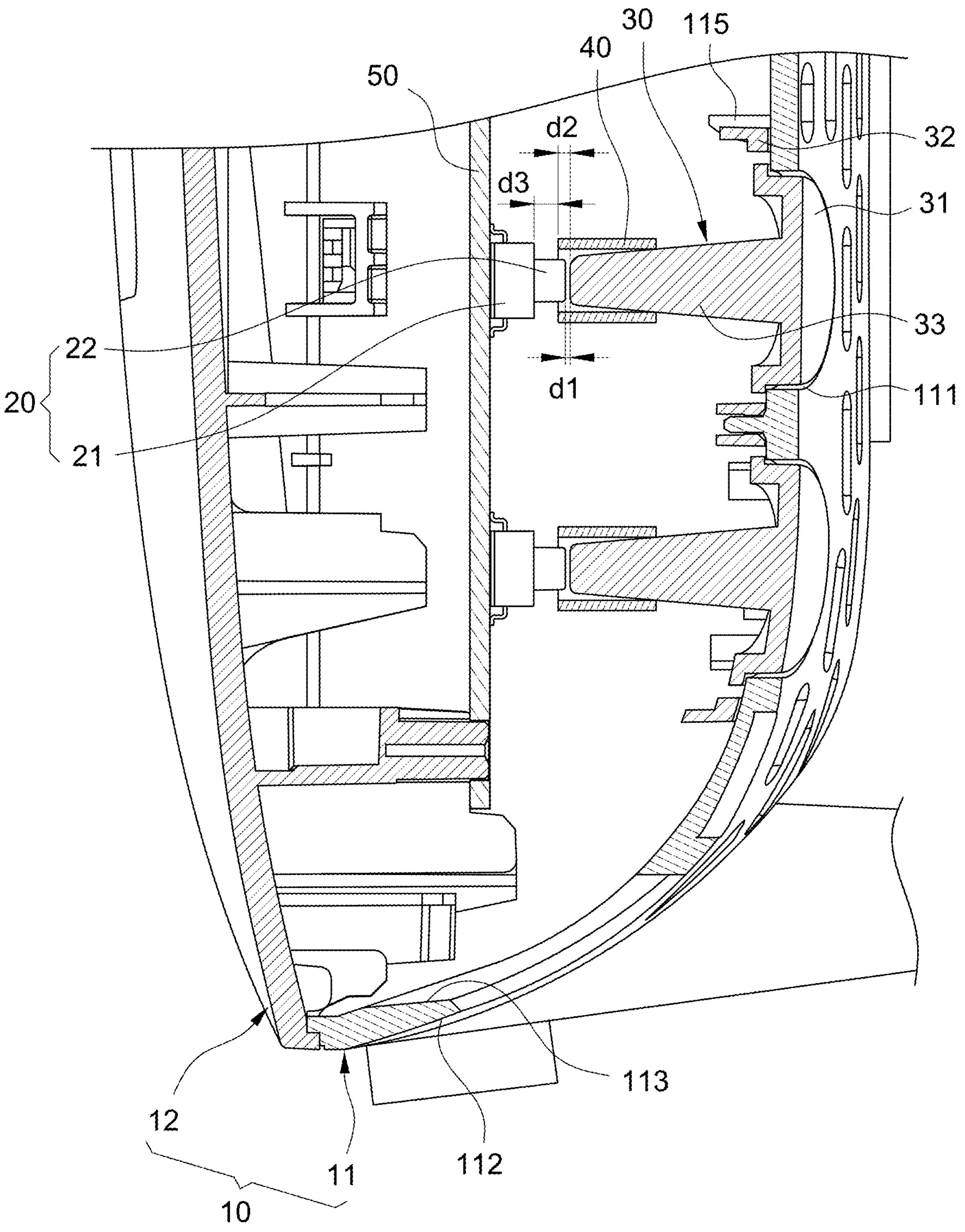
FIG. 5 is a partially exploded view according to this disclosure.

According to this embodiment, two positioning sleeves 40 are provided corresponding to the button assemblies 30, but scopes of this disclosure should not be limited to the embodiment. For example, one of positioning sleeves 40 is described following for illustration. The positioning sleeve 40 is in a hollow cylinder shape. According to this embodiment, the positioning sleeve 40 is made of Polycarbonate (PC), so that it is easy for processing and controlling dimension, and has a rigidity which is not too soft, but scopes of this disclosure should not be limited to the embodiment. The positioning sleeve 40 sleeves an end of the extending column 33. Specifically, according to this embodiment as shown in FIG. 5, the extending column 33 is tapered from the pressing plate 31 toward the button 20, so that an internal surface of the positioning sleeve 40 can be fastened with an external surface on the end of the extending column 33, namely that the positioning sleeve 40 has an end toward the pressing plate 31 which is fastened with the extending column 33. Of course, the positioning sleeve 40 and the extending column 33 may be formed as one piece. Alternatively, the positioning sleeve 40 and the extending column 33 may be combined by bonding, buckling, welding or locking. In addition, an inner diameter of the positioning sleeve 40 is larger than the outer diameter of the driven part 22, and the inner diameter of the positioning sleeve 40 is less than an inner diameter of the base 21.

Figure 6:
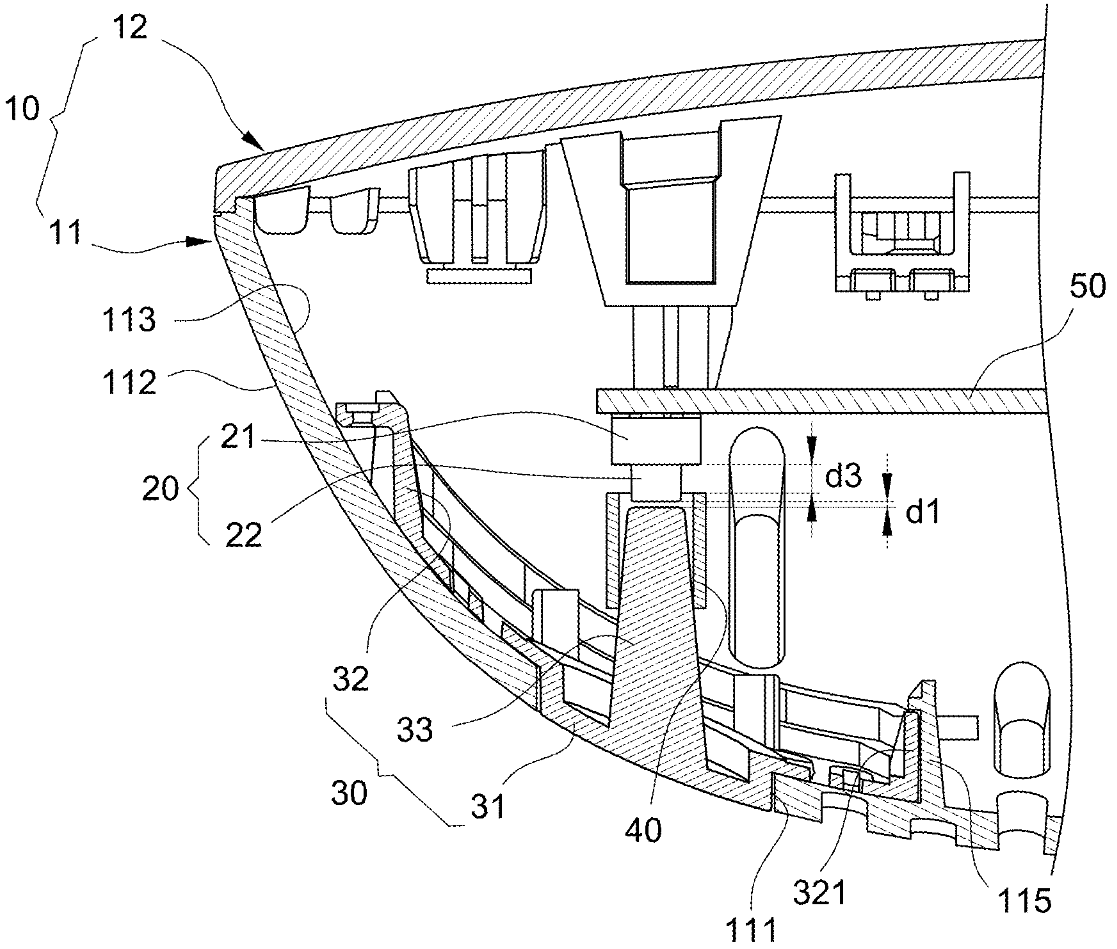
FIG. 6 is a partially exploded view in an initial status according to this disclosure.
Figure 7:
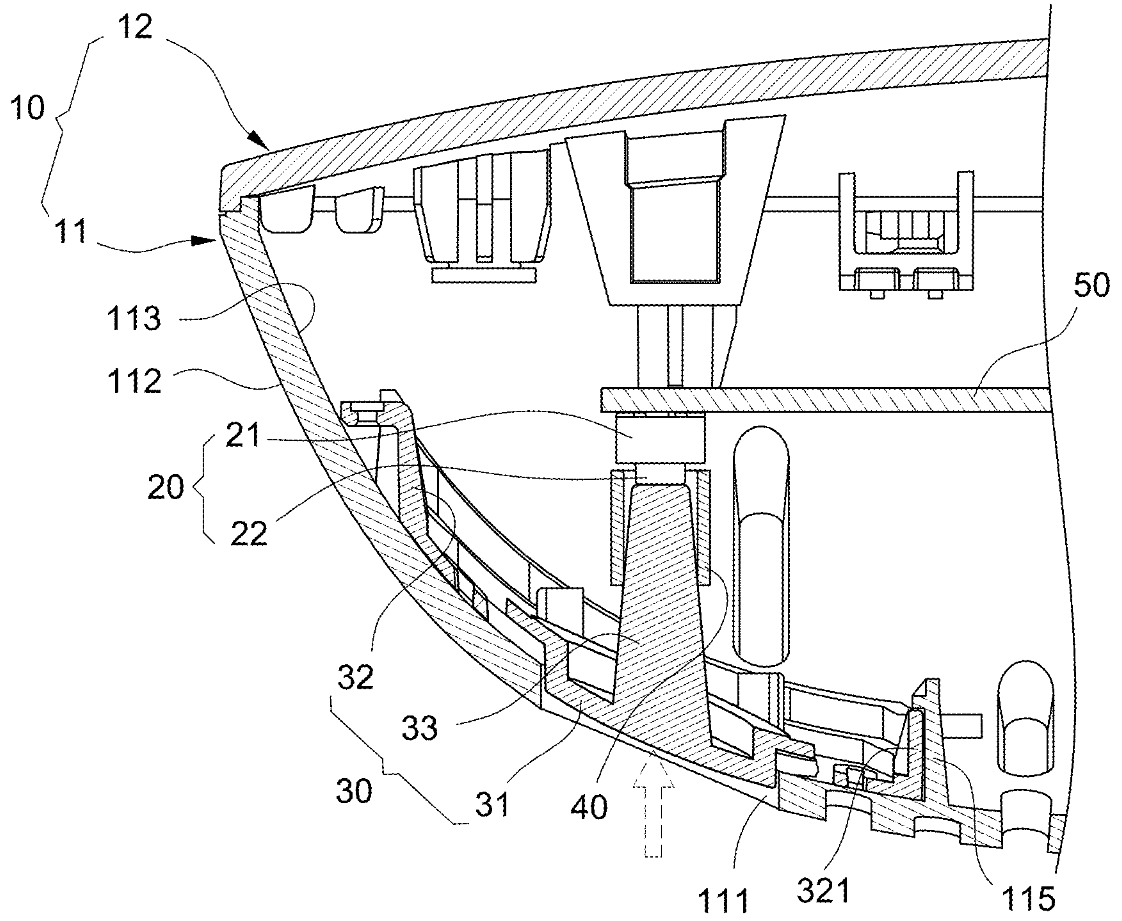
FIG. 7 is a partially exploded view in a normally pressed status according to this disclosure.
Figure 8:
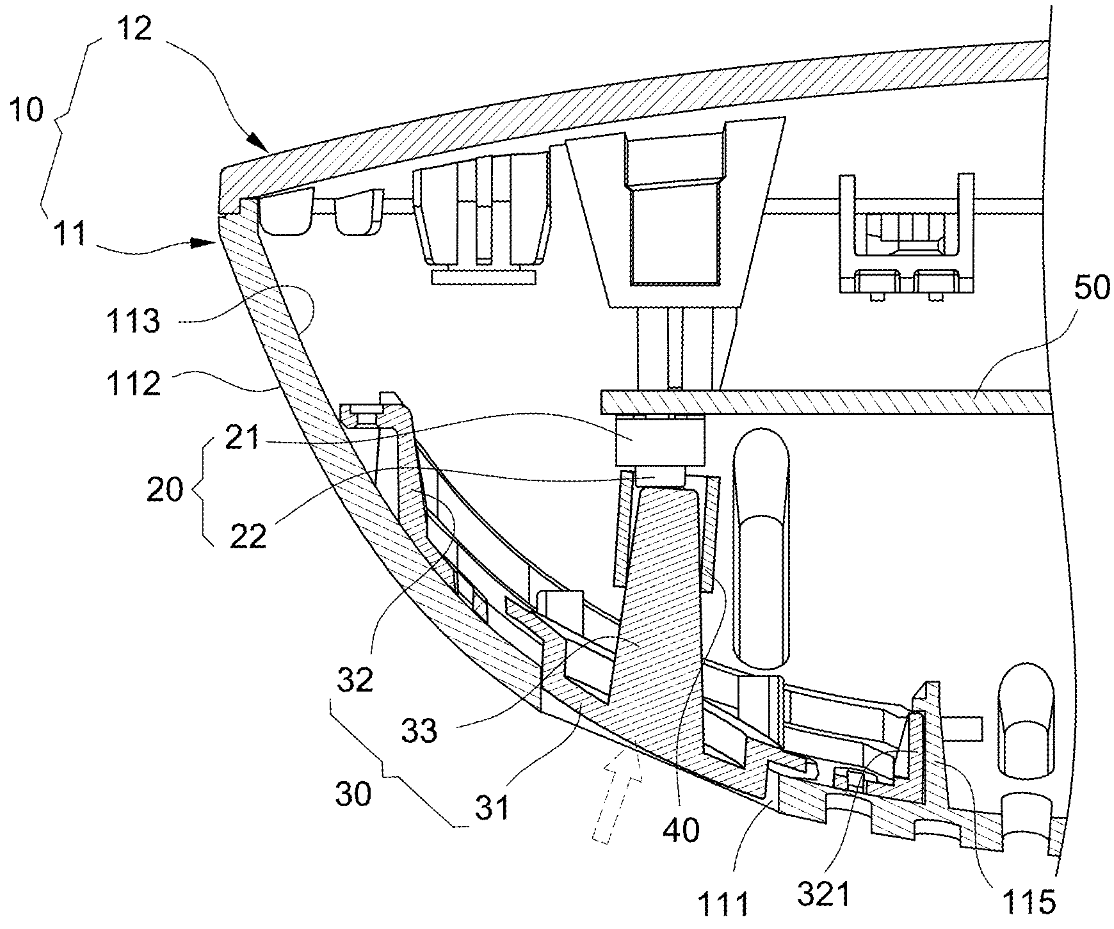
FIG. 8 is a partially exploded view in an obliquely pressed status according to this disclosure.

Referring to FIG. 6, accordingly, when the button assembly 30 is free from forcing, the pressing plate 31 is accommodated in the through hole 111 (in another embodiment, the pressing plate 31 may partially protrudes from the curved surface 112 of the first case 11), and a gap d1 is defined between the end of the extending column 33 and a side of the driven part 22 away from the base 21. Further refer to FIGS. 7 and 8, when the button assembly 30 is pressed by an external force, the pressing plate 31 is retracted into the through hole 111 of the first case 11, thereby driving the extending column 33 to abut against the driven part 22. The positioning sleeve 40 surrounds the driven part 22 so as to be positioned and prevent the button assembly 30 from shifting from the button 20 caused by over skew, so that the button assembly 30 is further avoid from getting stuck or trigger failure caused by shifting or slipping off, and the extending column 33 can withstand greater pressing forces (approximately 3 kgf) in normal (see FIG. 7), oblique (see FIG. 8) or lateral directions without slipping off over the button 20.

Furthermore, refer to FIGS. 5 and 6, an installation distance d2 is defined between an end surface of the positioning sleeve 40 away from the first case 11 and an end surface on the extending column 33 away from the first case 11. The installation distance d2 is greater than or equal to 0.5 mm and less than or equal to 3 mm. According to this embodiment, the installation distance d2 is greater than or equal to 1.62 mm and less than or equal to 1.7 mm. A spaced distance d3 is defined between the positioning sleeve 40 and the base 21, and the spaced distance d3 is larger than the gap d1. Accordingly, when the button assembly 30 is free from forcing namely in an initial state, the positioning sleeve 40 is ensured to surround a periphery on a top of the driven part 22. When the button assembly 30 is in a pressed state namely the extending column 33 contacts the driven part 22, an end surface of the positioning sleeve 40 away from the first case 11 is free from contacting the base 21 to avoid from interference. It is worth noting that during an assembly process in manufacturing, the installation distance d2 between each positioning sleeve 40 and the extending column 33 correspondingly fixed therewith is stably and accurately controlled within the required range by tools, semi-automation machines or automation machines.

Figure 2:
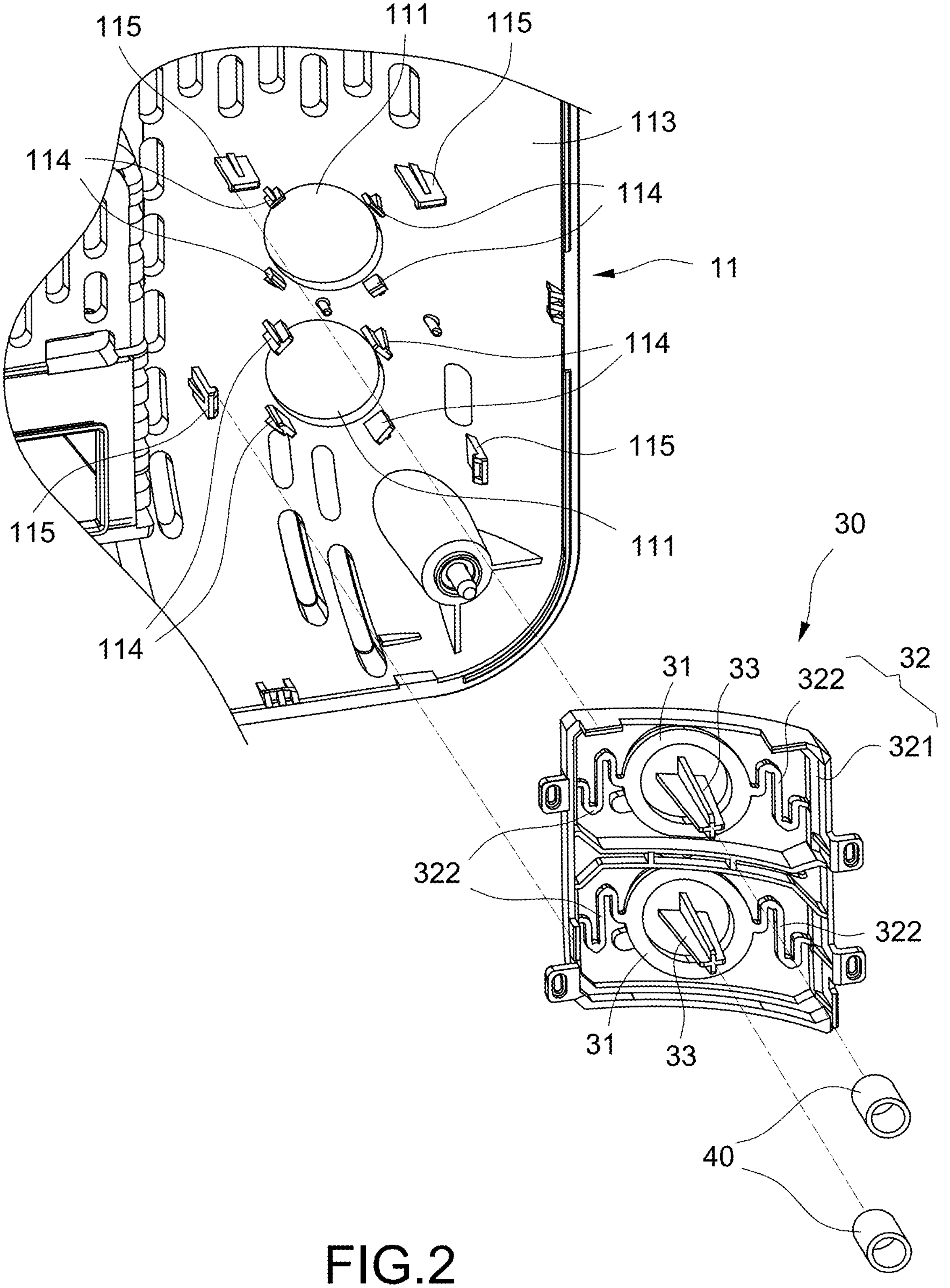
FIG. 2 is a partial exploded view according to this disclosure.
Figure 3:
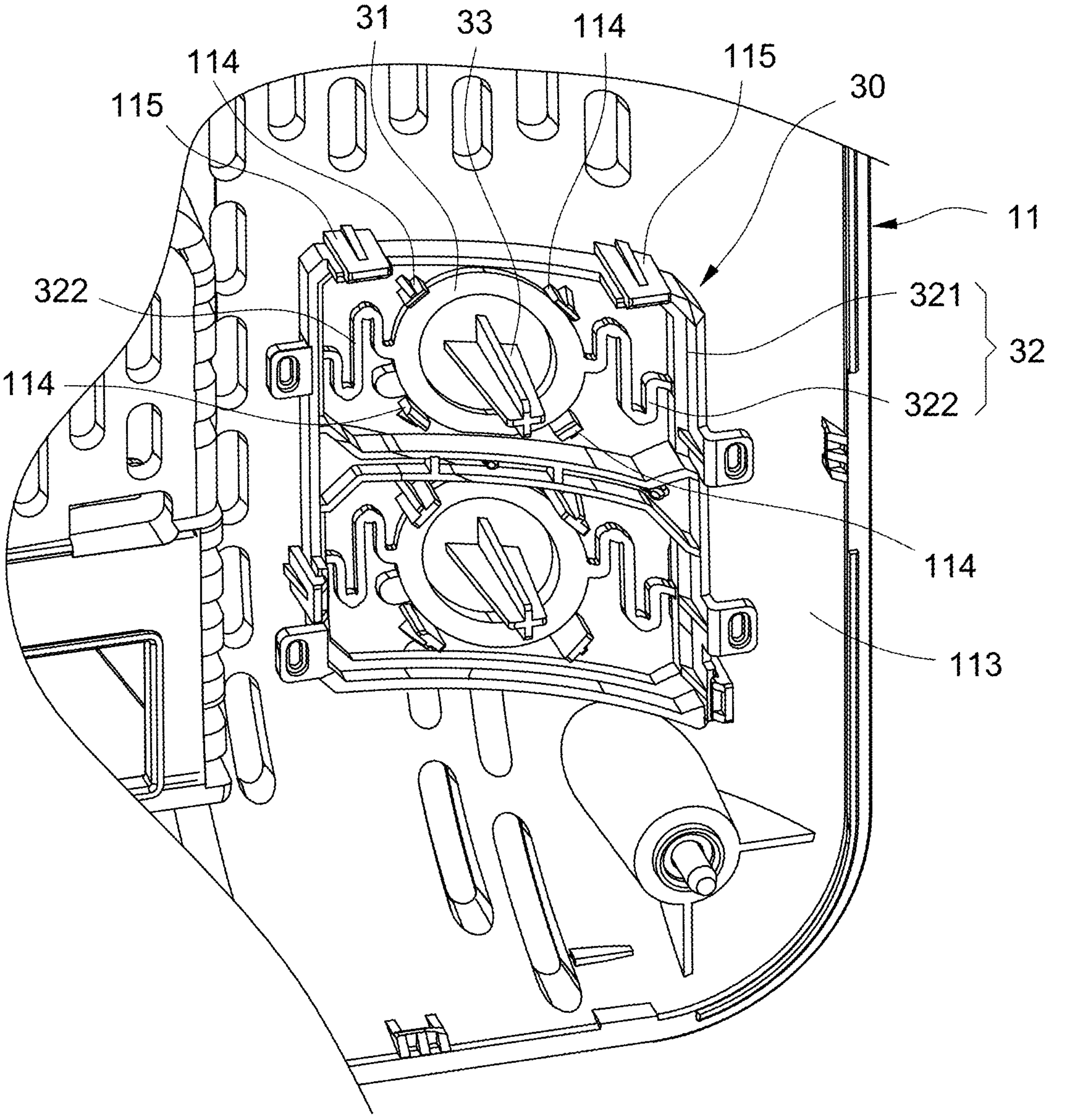
FIG. 3 is a partially perspective view illustrating a first case and a button assembly according to this disclosure.
Figure 4:
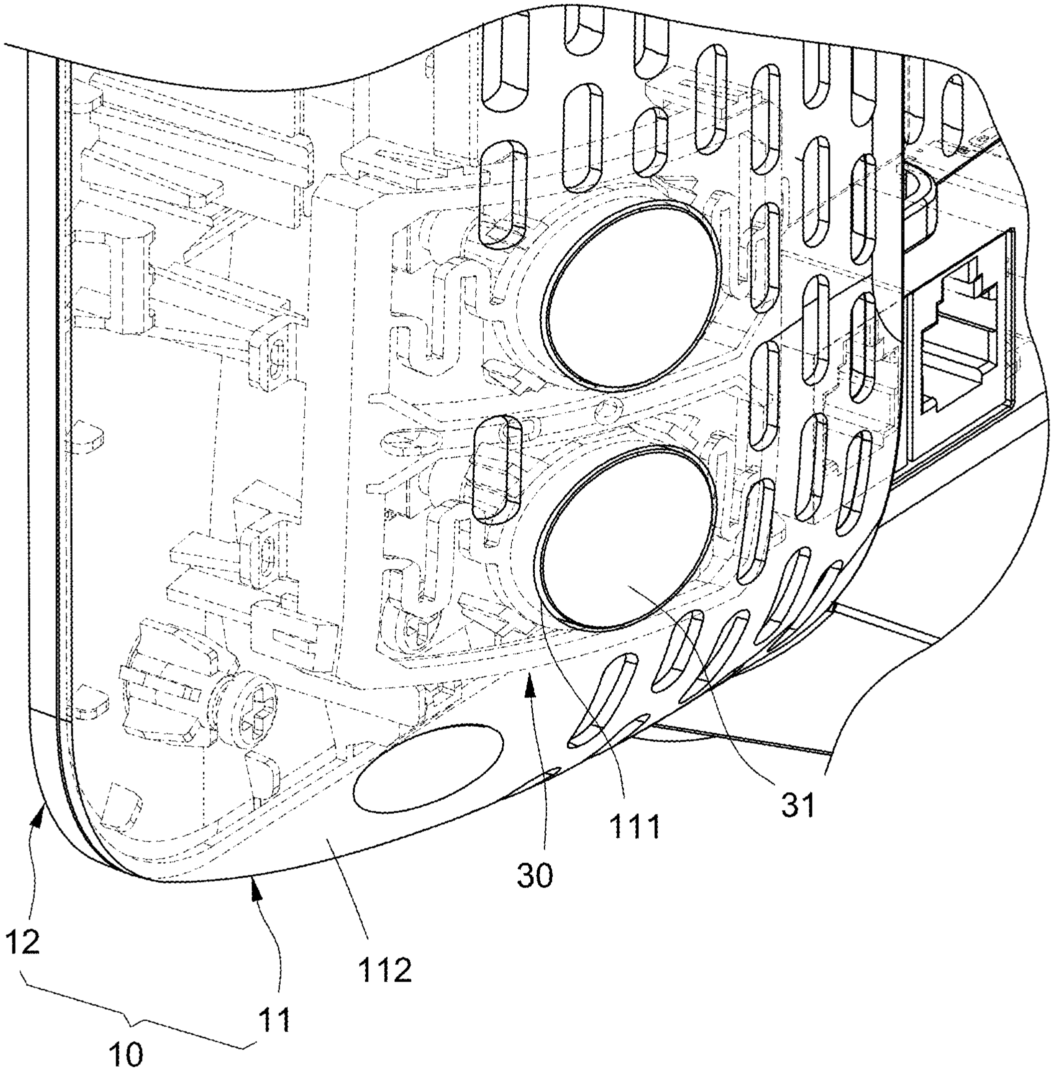
FIG. 4 is a partially perspective view according to this disclosure.

Further referring FIGS. 2 and 3, the first case 11 also has a plurality of limiting pieces 114. Each limiting piece 114 is extended from the inner surface 113 toward the second case 12. The limiting pieces 114 surrounds a periphery of the pressing plate 31 to limit a movement range of the pressing plate 31. According to this embodiment, four limiting pieces 114 are provided and arranged at equal angles, but scopes of this disclosure should not be limited to the embodiment. For example, two three, or more than five limiting pieces 114 may be provided.

Please refer to FIGS. 1 to 6. The installation seat 32 has a frame 321 and at least a pair of elastic arms 322, and the first case 11 also has a plurality of hooks 115. The frame 321 surrounds the pressing plate 31. Each hook 115 is extended from the internal surface 113 of the first case 11 toward the second case 12, and the hooks 115 buckle to fix the frame 321. Of course, the fixing form of the installation seat 32 and the first case 11 is not limited to be fix by the approach mentioned above. For example, the installation seat 32 may be fixed on the internal surface 113 of the first case 11 by clamping, bonding, welding, locking, etc. Each elastic arm 322 has two ends connected to the pressing plate 31 and the frame 321 respectively. According to this embodiment, each elastic arm 322 in is substantially S-shaped, thereby having a required structural strength and a good elastic deformability, but scopes of this disclosure should not be limited to the embodiment. For example, each elastic arm 322 may be a wavy shape, a zigzag shape or a lightning shape, etc. In addition, in this embodiment, each pressing plate 31 is configured with a pair of elastic arms 322, but scopes of this disclosure should not be limited to the embodiment. For example, each pressing plate 31 may be configured with greater than or equal to three elastic arms 322.

The curved-surface button structure of this disclosure is provided with a positioning sleeve 40 at the end of the extending column 33, and the inner diameter of the positioning sleeve 40 is larger than the outer diameter of the driven part 22. Moreover, the inner diameter of the positioning sleeve 40 is smaller than the inner diameter of the base 21, so that the button assembly 30 disposed on the curved surface 112 is positioned by the positioning sleeve 40 surrounding the driven part 22 when pressed by an external force, thereby effectively positioning a movement range of the button assembly 30 to avoid shifting from the button 20 which is caused by skew. Furthermore, the button assembly 30 is prevented from getting stuck of trigger failure caused by shifting or slipping off. Also, each elastic arm 322 is prevented from broken caused by over pressing by a user, and the extending column 33 can withstand greater pressing forces in normal, oblique or lateral directions without slipping off over the button 20.

Accordingly, this disclosure is believed to be applicable in industry, novel and inventive. Although this disclosure has been described with reference to the foregoing embodiment, it will be understood that the disclosure is not limited to the details thereof. Various equivalent variations and modifications can still occur to those skilled in this art in view of the teachings of this disclosure. Thus, all such variations and equivalent modifications are also embraced within the scope of this disclosure as defined in the appended claims.

What is claimed is:

1. A curved-surface button structure, comprising: a housing, comprising a first case and a second case assembled with each other, the first case comprising a through hole, a curved surface and an internal surface, the curved surface and the internal surface arranged at two sides of the first case opposite to each other, the through hole communicating between the curved surface and the internal surface;

a button, arranged in the housing, comprising a base and a driven part, the driven part pressably connected with the base to face the internal surface;

a button assembly, comprising a pressing plate, an installation seat and an extending column, the installation seat arranged on the internal surface, the pressing plate connected with the installation seat corresponding to the through hole, the extending column extended from the pressing plate toward the button; and a positioning sleeve, adapted to sheathe an end of the extending column, and an inner diameter of the positioning sleeve being greater than an outer diameter of the driven part;

wherein when the button assembly is not pressed by an external force, the pressing plate is accommodated in the through hole, and a gap is defined between the extending column and the driven part;

wherein when the button assembly is pressed by an external force, the pressing plate is moved further into the through hole, the extending column presses the driven part, and the positioning sleeve surrounds the driven part;

wherein an installation distance is defined between an end surface of the positioning sleeve away from the first case and an end surface of the extending column away from the first case, and the installation distance is greater than or equal to 0.5 mm and less than or equal to 3 mm.

2. The curved-surface button structure according to claim 1, wherein the installation distance is greater than or equal to 1.62 mm and less than or equal to 1.7 mm.

3. The curved-surface button structure according to claim 1, wherein a distance between the positioning sleeve and the base is larger than the gap, when the button assembly is not pressed by an external force.

4. The curved-surface button structure according to claim 1, wherein the positioning sleeve is free from contacting the base, when the extending column abuts against the driven part.

5. The curved-surface button structure according to claim 1, wherein the first case comprises a plurality of limiting pieces, each limiting piece is extended from the internal surface toward the second case, and the limiting pieces surround the pressing plate to limit a movement range of the pressing plate.

6. The curved-surface button structure according to claim 1, wherein the extending column is a column with a cross-shaped cross section, the extending column is tapered from the pressing plate toward the button, and the positioning sleeve is in a hollow cylinder shape.

7. The curved-surface button structure according to claim 1, wherein the installation seat comprises a frame and a pair of elastic arms, the frame surrounds the pressing plate, each elastic arm comprises two ends respectively connected with the pressing plate and the frame.

8. The curved-surface button structure according to claim 7, wherein each of the elastic arms is in an S shape, a wavy shape, a zigzag shape or a lightning shape.

9. The curved-surface button structure according to claim 7, wherein the first case comprises a plurality of hooks, each hook is extended from the internal surface to the second case and snaps the frame.

10. The curved-surface button structure according to claim 1, wherein the inner diameter of the positioning sleeve is less than an outer diameter of the base.

11. The curved-surface button structure according to claim 1, wherein the extending column and the positioning sleeve are formed as one piece.

12. The curved-surface button structure according to claim 1, when the button assembly is not pressed by an external force, a spaced distance is defined between the positioning sleeve and the base, and the spaced distance is larger than the gap.

* * * * *